US007957219B2

(12) United States Patent
Hall et al.

(10) Patent No.: US 7,957,219 B2
(45) Date of Patent: Jun. 7, 2011

(54) METHOD AND APPARATUS FOR ELEVATION FOCUS CONTROL OF ACOUSTIC WAVES

(75) Inventors: Christopher S. Hall, Hopewell Junction, NY (US); Chien Ting Chin, Tarrytown, NY (US); Jan Frederik Suijver, Dommelen (NL); Bernardus Hendrikus Wilhelmus Hendriks, Eindhoven (NL); Stein Kuiper, Vught (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 291 days.

(21) Appl. No.: 12/297,902

(22) PCT Filed: Apr. 27, 2007

(86) PCT No.: PCT/IB2007/051582

§ 371 (c)(1), (2), (4) Date: Oct. 21, 2008

(87) PCT Pub. No.: WO2007/125500

PCT Pub. Date: Nov. 8, 2007

(65) Prior Publication Data

US 2009/0122639 A1 May 14, 2009

Related U.S. Application Data

(60) Provisional application No. 60/867,860, filed on Nov. 30, 2006, provisional application No. 60/796,987, filed on May 2, 2006.

(51) Int. Cl.
*G03B 42/06* (2006.01)

(52) U.S. Cl. ........................................................ 367/7

(58) Field of Classification Search ............... 367/7, 138
See application file for complete search history.

(56) References Cited

U.S. PATENT DOCUMENTS

| | | | | |
|---|---|---|---|---|
| 4,694,434 | A * | 9/1987 | von Ramm et al. | 367/7 |
| 5,738,098 | A | 4/1998 | Brock-Fisher et al. | |
| 2009/0122639 | A1 * | 5/2009 | Hall et al. | 367/7 |
| 2010/0087735 | A1 * | 4/2010 | Hall et al. | 367/7 |

FOREIGN PATENT DOCUMENTS

| | | | |
|---|---|---|---|
| JP | 6027853 | A | 2/1985 |
| WO | WO03069380 | A1 | 8/2003 |
| WO | WO2004051323 | A1 | 6/2004 |
| WO | WO2005122139 | A2 | 12/2005 |
| WO | WO 2007125500 | A2 * | 11/2007 |

OTHER PUBLICATIONS

Yoon et al, "Ultrasonic Phased Arrays with Variable Geometric Focusing for Hyperthermia Applications", Ferroelectrics and Frequency Control 39 (1992) March, No. 2, New York, US, pp. 273-278.

* cited by examiner

*Primary Examiner* — Dan Pihulic

(57) ABSTRACT

An acoustic probe includes an acoustic transducer having acoustic transducer elements arranged in a one-dimensional array; and a variably-refracting acoustic lens coupled to the acoustic transducer. The variably-refracting acoustic lens has a pair of electrodes configured to adjust the focus of the variably-refracting acoustic lens in response to a selected voltage applied across the electrodes. In one embodiment, the variably-refracting acoustic lens includes a cavity, first and second fluid media disposed within the cavity, and the pair of electrodes. The speed of sound of an acoustic wave in the first fluid medium is different than the speed of sound of the acoustic wave in the second fluid medium. The first and second fluid media are immiscible with respect to each other, and the first fluid medium has a substantially different electrical conductivity than the second fluid medium.

20 Claims, 4 Drawing Sheets

METHOD AND APPARATUS FOR ELEVATION FOCUS CONTROL OF ACOUSTIC WAVES

CROSS REFERENCE TO RELATED APPLICATIONS

This application claims the benefit of International Application Number PCT/IB2007/051582, filed Apr. 27, 2007, and U.S. Provisional Applications Ser. No. 60/867,860, filed Nov. 30, 2006 and 60/796,987, filed May 2, 2006, incorporated herein in whole by reference.

This invention pertains to acoustic imaging methods, acoustic imaging apparatuses, and more particularly to methods and apparatuses for elevation focus control for acoustic waves employing an adjustable fluid lens.

Acoustic waves (including, specifically, ultrasound) are useful in many scientific or technical fields, such as medical diagnosis, non-destructive control of mechanical parts and underwater imaging, etc. Acoustic waves allow diagnoses and controls which are complementary to optical observations, because acoustic waves can travel in media that are not transparent to electromagnetic waves.

Acoustic imaging equipment includes both equipment employing traditional one-dimensional ("1D") acoustic transducer arrays, and equipment employing fully sampled two-dimensional ("2D") acoustic transducer arrays employing microbeamforming technology.

In equipment employing a 1D acoustic transducer array, the acoustic transducer elements are often arranged in a manner to optimize focusing within a single plane. This allows for focusing of the transmitted and received acoustic pressure wave in both axial (i.e. direction of propagation) and lateral dimensions (i.e. along the direction of the 1D array). Out of plane (elevation) focusing is usually fixed by the acoustic transducer geometry, i.e., the elevation height of the acoustic transducer elements controls the natural focus of the array in the elevation dimension. For most medical applications, the out-of-plane (elevation) focus can only be changed by the addition of a fixed lens on the front of the acoustic transducer array to focus the majority of the acoustic energy at a nominal focus depth or through changing the geometry of the elements in the elevation height. Unfortunately, this compromise often leads to sub-optimal elevation focusing at different depths. Also, this leads to the inability to adjust the focus in the elevation direction in real-time which, in turn, leads to a different interrogated volume as a function of depth. The result is an image contaminated with "out-of-plane" information or "clutter."

Several technological solutions to this problem have been proposed including increased element count (1.5D arrays, 2D arrays) or adjustable lens material (rheological delay structures) but each has been less than universally accepted. Increasing the element count can only be successful if each element is individually addressable—increasing the cost of the associated electronics enormously. Adjustable delays such as a rheological material have less than optimal solution because of the added need to adjust the delay separately above each element—also adding complexity.

Accordingly, it would be desirable to provide an acoustic imaging device which allows for real-time adjustment of the elevation focus to make possible delivery of maximal energy at varying depths with the desired elevation focusing. It would further be desirable to provide for such a device that allows one to easily switch between using a normal 1D acoustic transducer array, and adding additional "out-of-plane" focusing In one aspect of the invention, an acoustic imaging apparatus comprises: an acoustic probe, including, an acoustic transducer having a plurality of acoustic transducer elements arranged in a one-dimensional array, and a variably-refracting acoustic lens coupled to the acoustic transducer, the variably-refracting acoustic lens having at least a pair of electrodes adapted to adjust at least one characteristic of the variably-refracting acoustic lens in response to a selected voltage applied across the electrodes; an acoustic signal processor coupled to the acoustic transducer; a variable voltage supply adapted to apply selected voltages to the pair of electrodes; and a controller adapted to control the variable voltage supply to apply the selected voltages to the pair of electrodes.

In yet another aspect of the invention, an acoustic probe comprises: an acoustic transducer including a plurality of acoustic transducer elements arranged in a one-dimensional array; and a variably-refracting acoustic lens coupled to the acoustic transducer, the variably-refracting acoustic lens having at least a pair of electrodes adapted to adjust at least one characteristic of the variably-refracting acoustic lens in response to a selected voltage applied across the electrodes.

In still another aspect of the invention, a method of performing a measurement using acoustic waves comprises: (1) applying an acoustic probe to a patient; (2) controlling a variably-refracting acoustic lens of the acoustic probe to focus in a desired elevation focus; (3) receiving from the variably-refracting acoustic lenses, at an acoustic transducer, an acoustic wave back coming from a target area corresponding to the desired elevation focus; and (4) outputting from the acoustic transducer an electrical signal corresponding to the received acoustic wave.

FIGS. 1A-B show one embodiment of an acoustic probe including a variably-refracting acoustic lens coupled to an acoustic transducer.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention.

Variable-focus fluid lens technology is a solution originally invented for the express purpose of allowing light to be focused through alterations in the physical boundaries of a fluid filled cavity with specific refractive indices (see Patent Cooperation Treat (PCT) Publication WO2003/069380, the entirety of which is incorporated herein by reference as if fully set forth herein). A process known as electro-wetting, wherein the fluid within the cavity is moved by the application of a voltage across conductive electrodes, accomplishes the movement of the surface of the fluid. This change in surface topology allows light to be refracted in such a way as to alter the travel path, thereby focusing the light.

Meanwhile, ultrasound propagates in a fluid medium. In fact the human body is often referred to as a fluid incapable of supporting high frequency acoustic waves other than compressional waves. In this sense, the waves are sensitive to distortion by differences in acoustic speed of propagation in bulk tissue, but also by abrupt changes in speed of sound at interfaces. This property is exploited in PCT publication WO2005/122139, the entirety of which is incorporated herein by reference as if fully set forth herein. PCT publication WO2005/122139 discloses the use of a variable-focus fluid lens with differing acoustic speed of sound than the bulk tissue in contact with the lens, to focus ultrasound to and from an acoustic transducer. However, PCT publication WO2005/122139 does not disclose or teach the application of variable-focus fluid lens technology to 1D acoustic transducer arrays for elevation focus control of acoustic waves.

Disclosed below are one or more embodiments of an acoustic device including: an acoustic generator producing acoustic waves; an acoustic interface that is capable of variably refracting the acoustic waves; and means for directing the acoustic waves from the acoustic generator onto the acoustic interface. Beneficially, the acoustic interface includes a boundary between two separate fluid media in which the acoustic waves have different speeds of sound, and means for applying a force directly onto at least part of one of the fluid media so as to selectively induce a displacement of at least part of the boundary.

Figure 1A:
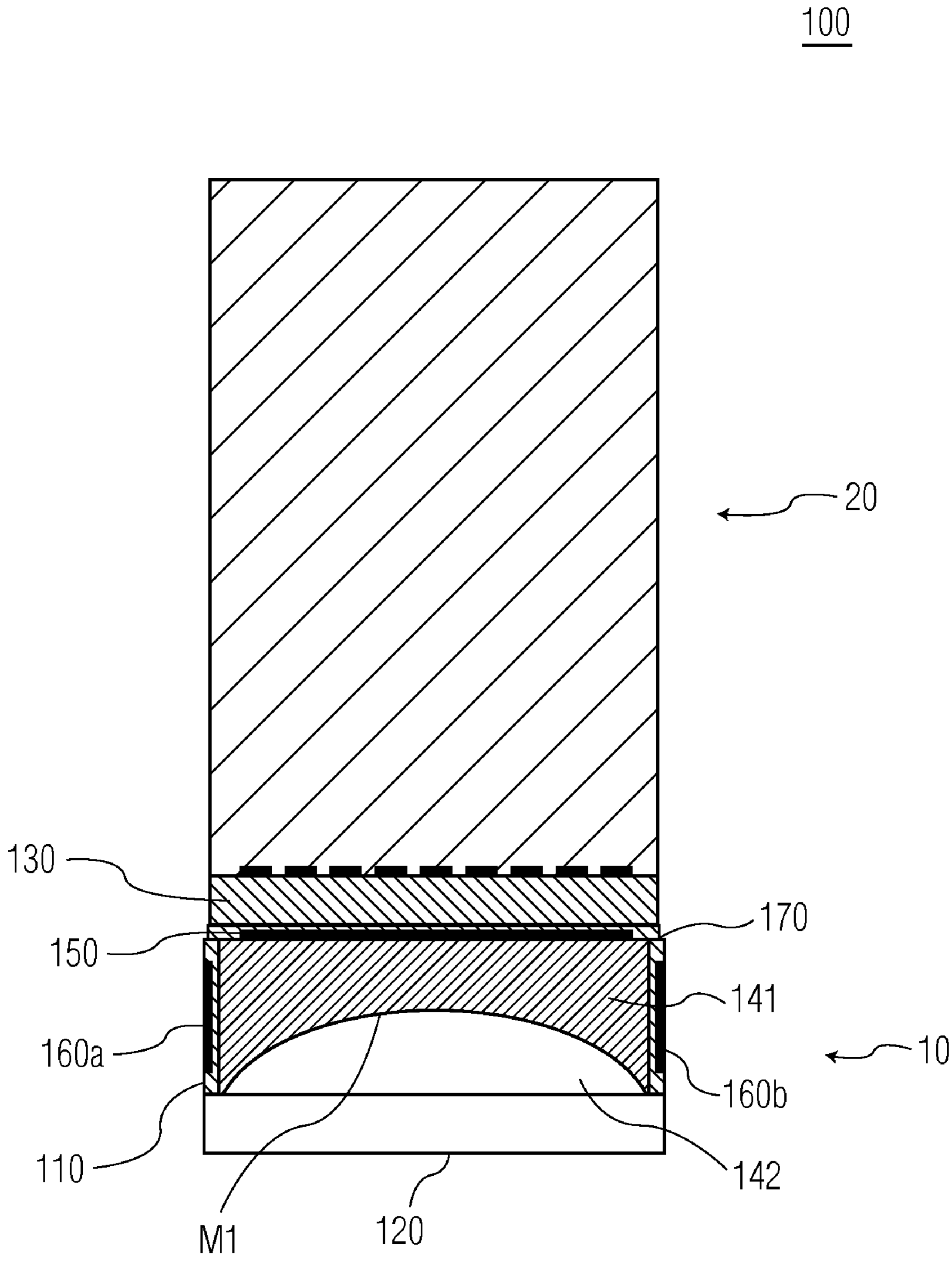
Figure 1B:
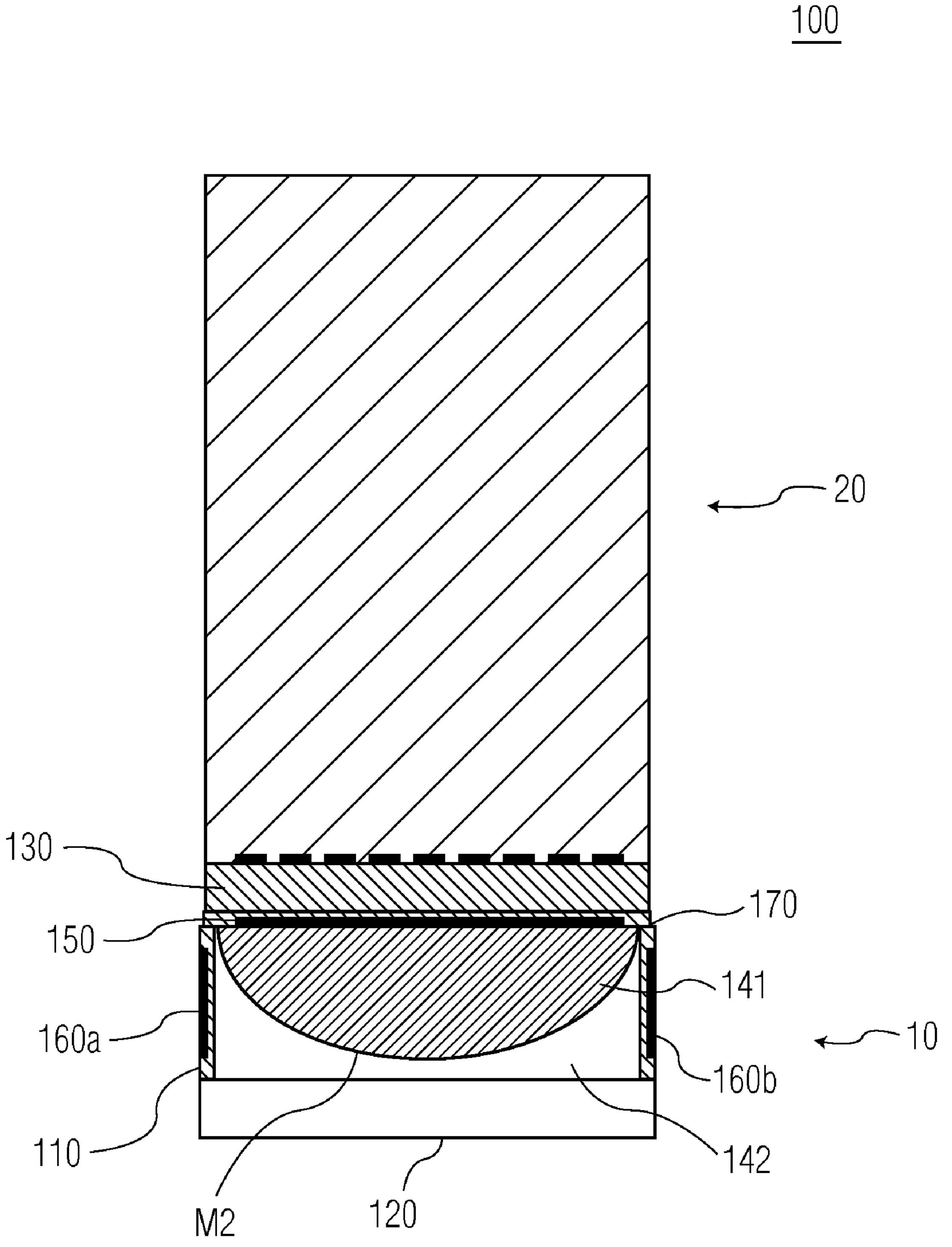

FIGS. 1A-B show one embodiment of an acoustic probe 100 comprising a variably-refracting acoustic lens 10 coupled to an acoustic transducer 20. Beneficially, variably-refracting acoustic lens 10 includes the ability to vary elevation focus of an acoustic wave along the axis of propagation ("focus"), and also perpendicular to this plane ("deflection"), as described in greater detail below. Variably-refracting acoustic lens 10 includes a housing 110, a coupling element 120, first and second fluid media 141 and 142, first electrode 150, and at least one second electrode 160*a*. Housing 110 may be of cylindrical shape, for example. Beneficially, the top end and bottom end of housing 110 are substantially acoustically transparent, while the acoustic waves do not penetrate through the side wall(s) of housing 110. Acoustic transducer 20 is coupled to the bottom of housing 110, beneficially by one or more acoustic matching layers 130.

In one embodiment, acoustic probe 100 is adapted to operate in both a transmitting mode and a receiving mode. In that case, in the transmitting mode acoustic transducer 20 converts electrical signals input thereto into acoustic waves which it outputs. In the receiving mode, acoustic transducer 20 converts acoustic waves which it receives into electrical signals which it outputs. Acoustic transducer 20 is of a type well known in the art of acoustic waves. Beneficially, acoustic transducer 20 comprises a 1D array of acoustic transducer elements.

In an alternative embodiment, acoustic probe 100 may instead be adapted to operate in a receive-only mode. In that case, a transmitting transducer is provided separately.

Beneficially, coupling element 120 is provided at one end of housing 110. Coupling element 120 is designed for developing a contact area when pressed against a body, such as a human body. Beneficially, coupling element 120 comprises a flexible sealed pocket filled with a coupling solid substance such as a Mylar film (i.e., an acoustic window) or plastic membrane with substantially equal acoustic impedance to the body.

Housing 110 encloses a sealed cavity having a volume V in which are provided first and second fluid media 141 and 142. In one embodiment, for example the volume V of the cavity within housing 110 is about 0.8 cm in diameter, and about 1 cm in height, i.e. along the axis of housing 110.

Advantageously, the speeds of sound in first and second fluid media 141 and 142 are different from each other (i.e., acoustic waves propagate at a different velocity in fluid medium 141 than they do in fluid medium 142). Also, first and second fluid medium 141 and 142 are not miscible with each another. Thus they always remain as separate fluid phases in the cavity. The separation between the first and second fluid media 141 and 142 is a contact surface or meniscus which defines a boundary between first and second fluid media 141 and 142, without any solid part. Also advantageously, one of the two fluid media 141, 142 is electrically conducting, and the other fluid medium is substantially non-electrically conducting, or electrically insulating.

In one embodiment, first fluid medium 141 consists primarily of water. For example, it may be a salt solution, with ionic contents high enough to have an electrically polar behavior, or to be electrically conductive. In that case, first fluid medium 141 may contain potassium and chloride ions, both with concentrations of 1 $mol.l^{-1}$, for example. Alternatively, it may be a mixture of water and ethyl alcohol with a substantial conductance due to the presence of ions such as sodium or potassium (for example with concentrations of 0.1 $mol.l^{-1}$). Second fluid medium 142, for example, may comprise silicone oil that is insensitive to electric fields. Beneficially, the speed of sound in first fluid medium 141 may be 1480 m/s, while the speed of sound in second fluid medium 142 maybe 1050 m/s.

Beneficially, first electrode 150 is provided in housing 110 so as to be in contact with the one of the two fluid mediums 141, 142 that is electrically conducting, In the example of FIGS. 1A-B, it is assumed the fluid medium 141 is the electrically conducting fluid medium, and fluid medium 142 is the substantially non-electrically conducting fluid medium. However it should be understood that fluid medium 141 could be the substantially non-electrically conducting fluid medium, and fluid medium 142 could be the electrically conducting fluid medium. In that case, first electrode 150 would be arranged to be in contact with fluid medium 142. Also in that case, the concavity of the contact meniscus as shown in FIGS. 1A-B would be reversed.

Meanwhile, second electrode 160*a* is provided along a lateral (side) wall of housing 110. Optionally, two or more second electrodes 160*a*, 160*b*, etc., are provided along a lateral (side) wall (or walls) of housing 110. Electrodes 150 and 160*a* are connected to two outputs of a variable voltage supply (not shown in FIGS. 1A-B).

Operationally, variably-refracting acoustic lens 10 operates in conjunction with acoustic transducer 20 as follows. In the exemplary embodiment of FIG. 1A, when the voltage applied between electrodes 150 and 160 by the variable voltage supply is zero, then the contact surface between first and second fluid media 141 and 142 is a meniscus M1. In a known manner, the shape of the meniscus is determined by the surface properties of the inner side of the lateral wall of the housing 110. Its shape is then approximately a portion of a sphere, especially for the case of substantially equal densities of both first and second fluid media 141 and 142. Because the acoustic wave W has different propagation velocities in first and second fluid media 141 and 142, the volume V filled with first and second fluid media 141 and 142 acts as a convergent lens on the acoustic wave W. Thus, the divergence of the acoustic wave W entering probe 100 is reduced upon crossing the contact surface between first and second fluid media 141 and 142. The focal length of variably-refracting acoustic lens 10 is the distance from acoustic transducer 20 to a source point of the acoustic wave, such that the acoustic wave is made planar by the lens variably-refracting acoustic lens 20 before impinging on acoustic transducer 20.

When the voltage applied between electrodes 150 and 160 by the variable voltage supply is set to a positive or negative value, and then the shape of the meniscus is altered, due to the electrical field between electrodes 150 and 160. In particular, a force is applied on the part of first fluid medium 141 adjacent the contact surface between first and second fluid media 141 and 142. Because of the polar behavior of first fluid medium 141, it tends to move closer to electrode 160, so that the contact surface between the first and second fluid media 141 and 142 flattens as illustrated in the exemplary embodiment of FIG. 1B. In FIG. 1B, M2 denotes the shape of the contact surface when the voltage is set to a non-zero value. Such electrically-controlled change in the form of the contact surface is called electrowetting. In case first fluid medium 141 is electrically conductive, the change in the shape of the contact surface between first and second fluid media 141 and 142 when voltage is applied is the same as previously described. Because of the flattening of the contact surface, the focal length of variably-refracting acoustic lens 10 is increased when the voltage is non-zero.

Beneficially, in the example of FIGS. 1A-B, in a case where fluid medium 141 consists primarily of water, then at least the bottom wall of housing 110 is coated with a hydrophilic coating 170. Of course in a different example where fluid medium 142 consists primarily of water, then instead the top wall of housing 110 may be coated with a hydrophilic coating 170 instead.

Meanwhile, PCT Publication WO2004051323, which is incorporated herein by reference in its entirety as if fully set forth herein, provides a detailed description of tilting the meniscus of a variably-refracting fluid lens.

Beneficially, as explained in greater detail below, the combination of variably-refracting acoustic lens 10 coupled to acoustic transducer 20 can replace a traditional 1D transducer array, with the added benefits of real-time adjustment of the elevation focus to make possible delivery of maximal energy at varying depths with the desired elevation focusing.

Figure 2:
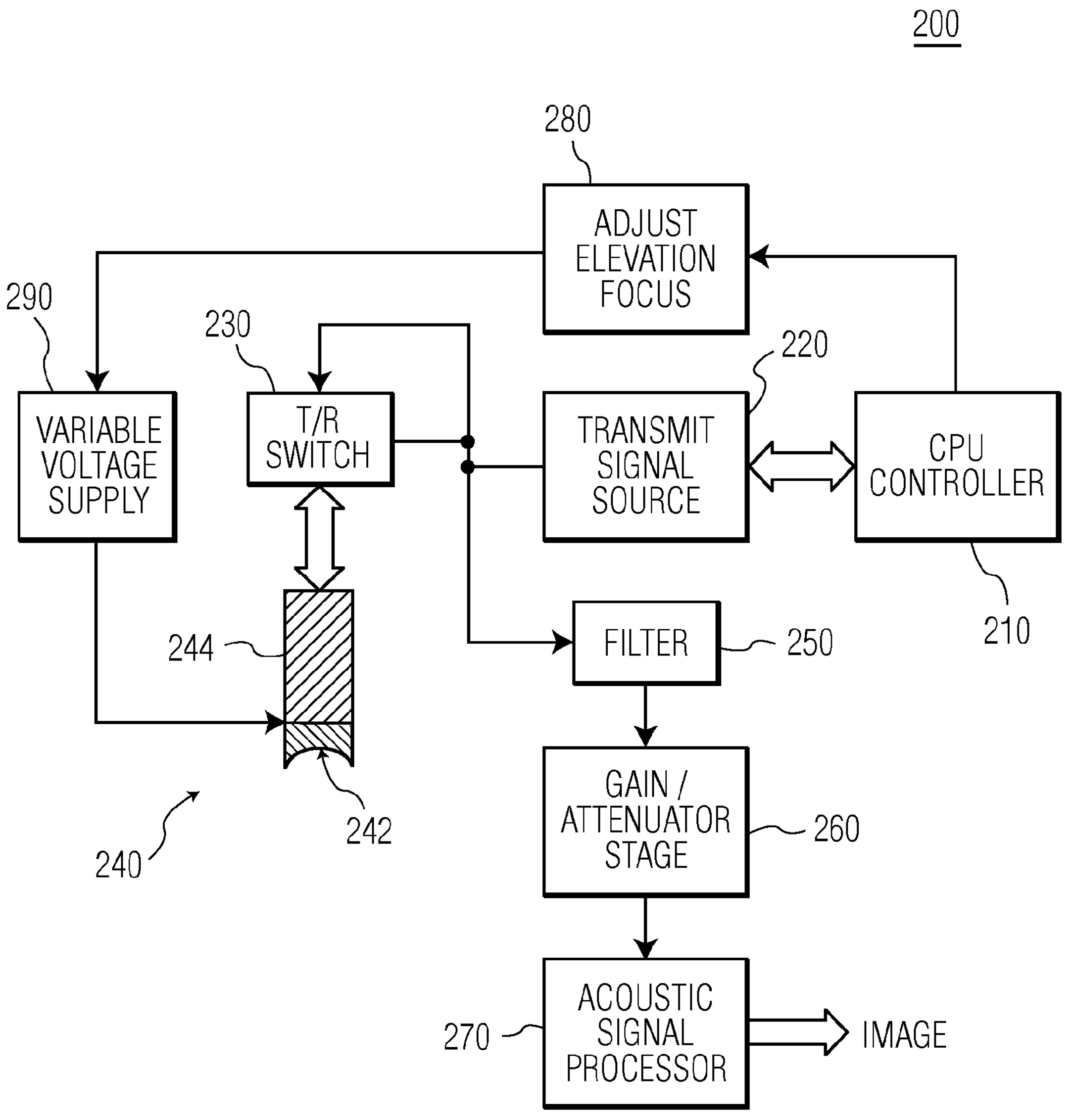
FIG. 2 shows a flowchart of one embodiment of a method of controlling the elevation focus of the acoustic imaging apparatus of FIG. 2.

FIG. 2 is a block diagram of an embodiment of an acoustic imaging apparatus 200 using an acoustic probe including a variably-refracting acoustic lens coupled to an acoustic transducer to provide real-time elevation focus control. Acoustic imaging apparatus 200 includes processor/controller 210, transmit signal source 220, transmit/receive switch 230, acoustic probe 240, filter 250, gain/attenuator stage 260, acoustic signal processing stage 270, elevation focus controller 280, and variable voltage supply 290. Meanwhile, acoustic probe 240 includes a variably-refracting acoustic lens 242 coupled to an acoustic transducer 244.

Acoustic probe 240 may be realized as acoustic probe 100, as described above with respect to FIG. 1. In that case, beneficially the two fluids 141, 142 of variably-refracting acoustic lens 242 have matching impedances, but differing speed of sounds. This would allow for maximum forward propagation of the acoustic wave, while allowing for control over the direction of the beam. Beneficially, fluids 141, 142 have a speed of sound chosen to maximize flexibility in the focusing and refraction of the acoustic wave.

Beneficially, acoustic transducer element 244 comprises a 1D array of acoustic transducer elements.

Operationally, acoustic imaging apparatus 200 operates as follows.

Elevation focus controller 280 controls a voltage applied to electrodes of variably-refracting acoustic lens 242 by variable voltage supply 290. As explained above, this in turn controls a "focal length" of variably-refracting acoustic lens 242.

When the surface of the meniscus defined by the two fluids in variably-refracting acoustic lens 242 reaches the correct topology, then processor/controller 210 controls transmit signal source 220 to generate a desired electrical signal to be applied to acoustic transducer 244 to generate a desired acoustic wave. In one case, transmit signal source 220 may be controlled to generate short time (broad-band) signals operating in M-mode, possibly short tone-bursts to allow for pulse wave Doppler or other associated signals for other imaging techniques. A typical use might be to image a plane with a fixed elevation focus adjusted to the region of clinical interest. Another use might be to image a plane with multiple foci, adjusting the elevation focus to maximize energy delivered to regions of axial focus. The acoustic signal can be a time-domain resolved signal such as normal echo, M-mode or PW Doppler or even a non-time domain resolved signal such as CW Doppler.

In the embodiment of FIG. 2, acoustic probe 240 is adapted to operate in both a transmitting mode and a receiving mode. As explained above, in an alternative embodiment acoustic probe 240 may instead be adapted to operate in a receive-only mode. In that case, a transmitting transducer is provided separately, and transmit/receive switch 230 may be omitted.

Figure 3:
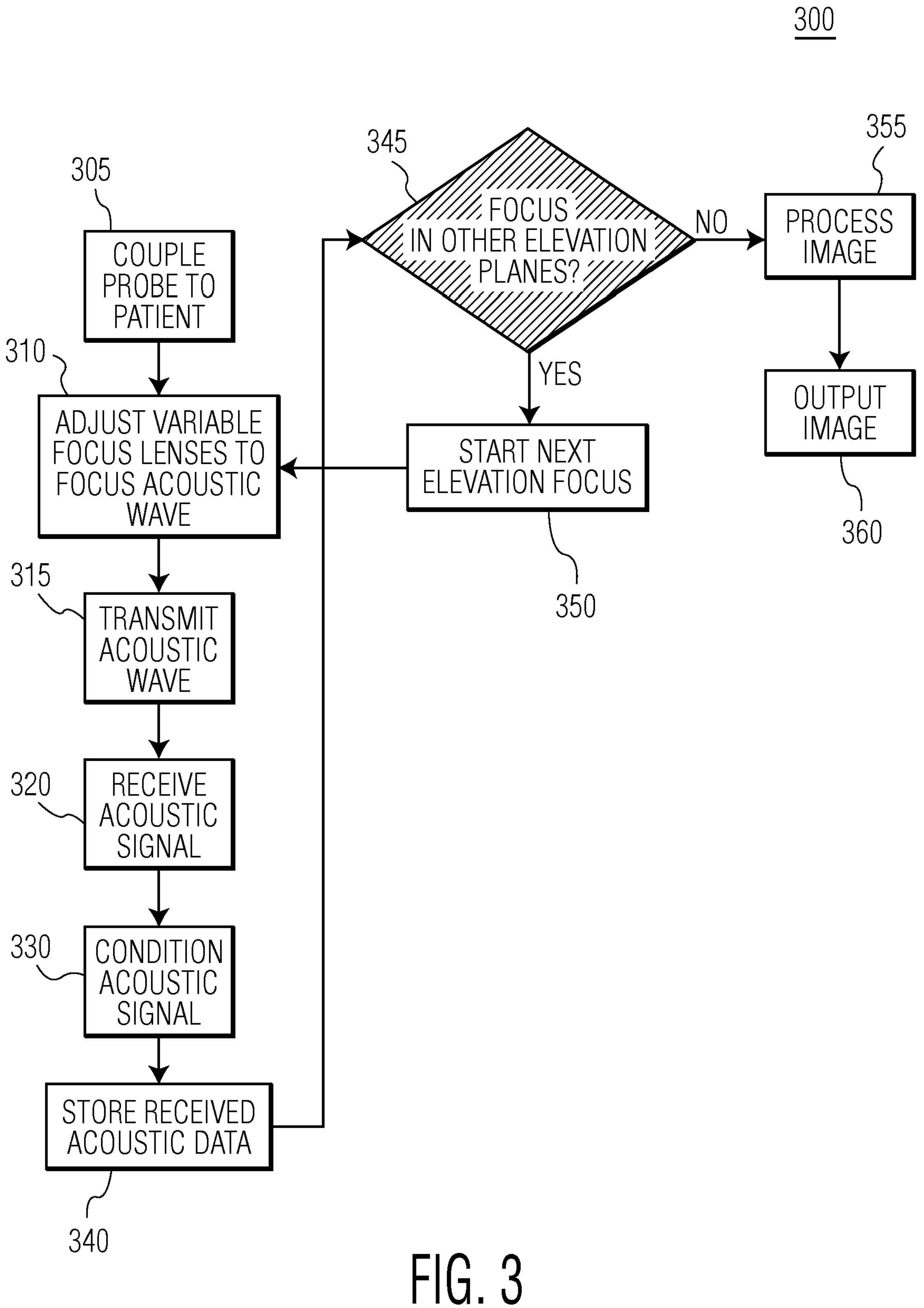
FIG. 3 shows a block diagram of an embodiment of another acoustic imaging apparatus.

FIG. 3 shows a flowchart of one embodiment of a method 300 of controlling the elevation focus of acoustic imaging apparatus 200 of FIG. 2.

In a first step 305, the acoustic probe 240 is coupled to a patient.

Then, in a step 310, elevation focus controller 280 controls a voltage applied to electrodes of variably-refracting acoustic lens 242 by variable voltage supply 290 to focus at a target elevation.

Next, in a step 315, processor/controller 210 controls transmit signal source 220 and transmit/receive switch 230 to apply a desired electrical signal(s) to acoustic transducer 244. Variably-refracting acoustic lens 242 operates in conjunction with acoustic transducer 244 to generate an acoustic wave and focus the acoustic wave in a target area of the patient, including the target elevation.

Subsequently, in a step 320, variably-refracting acoustic lens 242 operates in conjunction with acoustic transducer 244 to receive an acoustic wave back from the target area of the patient. At this time, processor/controller 210 controls transmit/receive switch 230 to connect acoustic transducer 244 to filter 250 to output an electrical signal(s) from acoustic transducer 244 to filter 350.

Next, in a step 330, filter 250, gain/attenuator stage 260, and acoustic signal processing stage 270 operate together to condition the electrical signal from acoustic transducer 244, and to produce therefrom received acoustic data.

Then, in a step 340, the received acoustic data is stored in memory (not shown) of acoustic signal processing stage 270 of acoustic imaging apparatus 200.

Next, in a step 345, processor/controller 210 determines whether or not it to focus in another elevation plane. If so, then the in a step 350, the new elevation plane is selected, and process repeats at step 310. If not, then in step 355 acoustic signal processing stage 270 processes the received acoustic data (perhaps in conjunction with processor/controller 210) to produce and output an image.

Finally, in a step 360, acoustic imaging apparatus 200 outputs the image.

In general, the method 300 can be adapted to make measurements where the acoustic wave is a time-domain resolved signal such as normal echo, M-mode or PW Doppler, or even a non-time domain resolved signal such as CW Doppler.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

The invention claimed is:

1. An acoustic imaging apparatus comprising:

an acoustic probe including, an acoustic transducer having a plurality of acoustic transducer elements arranged in a one-dimensional array, and a variably-refracting acoustic lens coupled to the acoustic transducer, the variably-refracting acoustic lens having a pair of electrodes configured to adjust at least one characteristic of the variably-refracting acoustic lens in response to a selected voltage applied across the pair of electrodes, wherein the at least one characteristic of the variably-refracting acoustic lens that is adjusted in response to the selected voltage applied across the pair of electrodes includes a focus and an elevation of the variably-refracting acoustic lens;

an acoustic signal processor coupled to the acoustic transducer;

a variable voltage supply configured to apply selected voltages to the pair of electrodes; and a controller configured to control the variable voltage supply to apply the selected voltages to the pair of electrodes to change the focus and the elevation of the variably-refracting acoustic lens.

2. The acoustic imaging apparatus of claim 1, further comprising:

a transmit signal source; and a transmit/receive switch configured to selectively couple the acoustic transducer to the transmit signal source, and to the acoustic signal processor.

3. The acoustic imaging apparatus of claim 1, wherein the variably-refracting acoustic lens comprises:

a cavity;

first and second fluid media disposed within the cavity; and the pair of electrodes, wherein a speed of sound of an acoustic wave in the first fluid medium is different than a corresponding speed of sound of the acoustic wave in the second fluid medium, wherein the first and second fluid media are immiscible with respect to each other, and wherein the first fluid medium has a substantially different electrical conductivity than the second fluid medium.

4. The acoustic imaging apparatus of claim 3, wherein the first and second fluid media have substantially equal densities.

5. The acoustic imaging apparatus of claim 3, wherein the variably-refracting acoustic lens includes a housing defining the cavity, and wherein a first one of the pair of electrodes is provided at a bottom or top of the housing, and a second one of the pair of electrodes is provided at a lateral side wall of the housing.

6. The acoustic imaging apparatus of claim 3, wherein a first one of the pair of electrodes is provided in contact with the one of the first and second fluid media having the greater electrical conductivity, and a second one of the pair of electrodes is isolated from the first and second fluid media having the greater electrical conductivity.

7. The acoustic imaging apparatus of claim 1, wherein the variably-refracting acoustic lens is coupled to the acoustic transducer by at least one acoustic matching layer.

8. An acoustic probe comprising:

an acoustic transducer including a plurality of acoustic transducer elements arranged in a one-dimensional array; and a variably-refracting acoustic lens coupled to the acoustic transducer, the variably-refracting acoustic lens having a pair of electrodes configured to adjust at least one characteristic of the variably-refracting acoustic lens in response to a selected voltage applied across the pair of electrodes, wherein the at least one characteristic of the variably-refracting acoustic lens that is adjusted in response to the selected voltage applied across the pair of electrodes includes a focus and an elevation of the variably-refracting acoustic lens.

9. The acoustic probe of claim 8, wherein the variably-refracting acoustic lens comprises:

a cavity;

first and second fluid media disposed within the cavity; and the pair of electrodes, wherein a speed of sound of an acoustic wave in the first fluid medium is different than a corresponding speed of sound of the acoustic wave in the second fluid medium, wherein the first and second fluid media are immiscible with respect to each other, and wherein the first fluid medium has a substantially different electrical conductivity than the second fluid medium.

10. The acoustic probe of claim 9, wherein the first and second fluid media have substantially equal densities.

11. The acoustic probe of claim 9, wherein the variably-refracting acoustic lens includes a housing defining the cavity, and wherein a first one of the pair of electrodes is provided at a bottom or top of the housing, and a second one of the pair of electrodes is provided at a lateral side wall of the housing.

12. The acoustic probe of claim 9, wherein a first one of the pair of electrodes is provided in contact with the one of the first and second fluid media having the greater electrical conductivity, and a second one of the pair of electrodes is isolated from the first and second fluid media having the greater electrical conductivity.

13. The acoustic probe of claim 8, wherein the variably-refracting lens is coupled to the acoustic transducer element by at least one acoustic matching layer.

14. A method of performing a measurement using acoustic waves, the method comprising the acts of:

(1) applying an acoustic probe to a patient;

(2) controlling a variably-refracting acoustic lens of the acoustic probe to focus in a desired elevation focus, wherein the controlling act includes control a variable voltage to electrodes of the variably-refracting acoustic lens to change the desired elevation focus of the variably-refracting acoustic lens;

(3) receiving from the variably-refracting acoustic lenses, at an acoustic transducer, an acoustic wave back coming from a target area corresponding to the desired elevation focus; and (4) outputting from the acoustic transducer an electrical signal corresponding to the received acoustic wave.

15. The method of claim 14, further comprising the act of:

(5) producing received acoustic data from the electrical signal output by the transducer.

16. The method of claim 15, further comprising the acts or:

(6) storing the received acoustic data into memory;

(7) determining whether or not to focus at another elevation focus;

(8) when another elevation focus is selected; repeating acts (1) through (7) for the new elevation focus; and (9) when no more elevation foci are selected, processing the stored acoustic data and outputting an image from the processed acoustic data.

17. The method of claim 14, further comprising, prior to act (3), the act of applying an electrical signal to the acoustic transducer coupled to the variably-refracting acoustic lens to generate an acoustic wave focused in the desired elevation focus.

18. The method of claim 14, wherein controlling the variably-refracting acoustic lens to focus in a target region, includes applying the voltages to the electrodes of the variably-refracting acoustic lens so as to displace two fluids disposed in a housing of the variably-refracting acoustic lens with respect to each other, wherein the two fluids have different acoustic wave propagation velocities with respect to each other.

19. The acoustic imaging apparatus of claim 1, wherein the controller is configured to control the variable voltage supply to apply the selected voltages to the pair of electrodes to vary an elevation focus of an acoustic wave along an axis of propagation of the acoustic wave and along a perpendicular axis which is perpendicular to the axis of propagation.

20. The acoustic imaging apparatus of claim 1, wherein the controller is configured to provide real-time elevation focus control.

* * * * *